(12) United States Patent  
Kinoshita et al.

(10) Patent No.: US 11,921,092 B2  
(45) Date of Patent: Mar. 5, 2024

(54) VIAL SUPPLY SYSTEM AND GAS CHROMATOGRAPHY ANALYSIS SYSTEM

(71) Applicant: SHIMADZU CORPORATION, Kyoto (JP)

(72) Inventors: Shori Kinoshita, Kyoto (JP); Shinichi Yuki, Kyoto (JP); Shingo Masuda, Kyoto (JP); Yuki Komori, Kyoto (JP); Daiki Fukushima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 216 days.

(21) Appl. No.: 17/510,672

(22) Filed: Oct. 26, 2021

(65) Prior Publication Data

US 2022/0155264 A1    May 19, 2022

(30) Foreign Application Priority Data

Nov. 16, 2020   (JP) ................................ 2020-190157

(51) Int. Cl.
*G01N 30/24* (2006.01)
*G01N 1/14* (2006.01)
(Continued)

(52) U.S. Cl.
CPC ............... *G01N 30/24* (2013.01); *G01N 1/14* (2013.01); *G01N 35/1011* (2013.01); *G06F 3/0412* (2013.01)

(58) Field of Classification Search
CPC .......... G01N 30/24; G01N 30/00; G01N 1/14; G01N 35/1011; G01N 2030/025; G01N 35/0099; G01N 35/04; G01N 35/1095; G01N 2035/0091; G01N 2035/0441; G01N 35/00871; G01N 30/02; G01N 30/18; G01N 35/00693; G01N 2030/027;
(Continued)

(56) References Cited

U.S. PATENT DOCUMENTS

2019/0160663 A1   5/2019   Kurihara et al.
2020/0011890 A1   1/2020   Fasanotti et al.

FOREIGN PATENT DOCUMENTS

CN   109834698 A   6/2019
CN   110383057 A   10/2019
(Continued)

OTHER PUBLICATIONS

Computer Translation CN109834698, May 2023.*
(Continued)

*Primary Examiner* — Robert R Raevis
(74) *Attorney, Agent, or Firm* — Muir Patent Law, PLLC (57) ABSTRACT

A vial supply system is provided with: a sampler configured to supply a vial to a predetermined supply destination by a transport arm; a management device communicatively connected to the sampler, the management device being configured to manage a supply operation of the vial by the sampler; and a display device provided so as to be able to communicate with the management device. When a teaching mode for performing teaching for setting a position of a transport arm at the time when a transport arm of the sampler transports the vial to and from the supply destination is started, the management device is configured to cause the display device to display an operation to be performed by a user in the teaching.

6 Claims, 8 Drawing Sheets

(51) Int. Cl.
*G01N 35/10* (2006.01)
*G06F 3/041* (2006.01)

(58) Field of Classification Search
CPC ... G01N 2035/1048; G01N 2035/1051; G01N 35/109; G06F 3/0412; B25J 9/161; B25J 9/1612; B25J 9/1664; B25J 13/00; B25J 9/1692; G09B 5/02
USPC ......... 73/1.01, 1.79, 864.21, 864.23–864.25, 73/866.3; 702/94, 95
See application file for complete search history.

(56) References Cited

FOREIGN PATENT DOCUMENTS

| | | |
|---|---|---|
| JP | H04164257 A | 6/1992 |
| JP | H09325153 A | 12/1997 |
| JP | 3188929 U | 2/2014 |
| JP | 2019025562 A | 2/2019 |
| JP | 2019093492 A | 6/2019 |

OTHER PUBLICATIONS

First Office Action dated Mar. 17, 2023 for the Chinese Patent Application No. 202111340224.3 from the Chinese Patent Office.
First Office Action dated Oct. 24, 2023 by the Japanese Patent Office for the corresponding Japanese Patent Application No. 2020-190157.
Second Office Action dated Nov. 23, 2023 issued by the Chinese Patent Office for the corresponding Chinese Patent Application No. 202111340224.3.

\* cited by examiner

VIAL SUPPLY SYSTEM AND GAS CHROMATOGRAPHY ANALYSIS SYSTEM

CROSS-REFERENCE TO RELATED APPLICATIONS

This application claims priority under 35 U.S.C. § 119 to Japanese Patent Application No. 2020-190157 filed on Nov. 16, 2020, the entire disclosure of which is incorporated herein by reference in its entirety.

BACKGROUND OF THE INVENTION

Field of the Invention

The present invention relates to a vial supply system and a gas chromatography analysis system.

Description of the Related Art

An automatic sample injection device (hereinafter referred to as "injector") is known in which a sample is automatically injected into a gas chromatography analysis device (hereinafter referred to as "gas chromatograph") (see Patent Document 1). The injector is provided with a movable turret in which a plurality of vials each containing a sample is set and a syringe for suctioning the sample from the vial set in the turret. When injecting the sample into the gas chromatograph, the turret is moved such that the vial containing a target sample is placed at a predetermined position, and the sample in the vial placed at the predetermined position is suctioned by the syringe and injected into the analysis device.

Further, there is a limitation in the number of vials capable of being set in the turret of the injector. In a case where the number of samples is large, all of the samples cannot be loaded to the injector. For this reason, in some cases, a sampler for supplying vials each containing a sample to an injector is used together with the injector. A sampler is a device provided with a transport arm for transporting a vial with the vial gripped by a gripper. In the case of using the sampler together with the injector, it is necessary to perform teaching for storing the position of the transport arm of the sample when the transport arm transports the vial between the transport arm and the turret of the injector.

PRIOR ART DOCUMENT

Patent Document

Patent Document 1: Japanese Unexamined Patent Application Publication No. H9-325153

SUMMARY OF THE INVENTION

Problems to be Solved by the Invention

In the teaching, for example, it is required to manually move the transport arm to adjust the position of the transport arm so that the gripper is located to a predetermined position above the turret of the injector which is a transport destination. Alternatively, it is required to adjust the height of the transport arm while using an operation button provided to the injector or the like. Although such an operation method is described in a manual, it is not easy for an unfamiliar operator to perform it while referring to the manual. For this reason, there is a possibility that the device may be damaged by erroneous operations or the teaching may fail to cause a transport error.

The present invention has been made in view of the above-described problems. The present invention aims to facilitate teaching of a sampler.

Means for Solving the Problems

A vial supply system according to the present invention, includes:
   a sampler configured to supply a vial to a predetermined supply destination by a transport arm;
   a management device communicatively connected to the sampler, the management device being configured to manage a supply operation of the vial by the sampler; and
   a display device provided so as to be able to communicate with the management device,
   wherein when a teaching mode for performing teaching for setting a position of the transport arm at the time when the transport arm of the sampler transports the vial to and from the supply destination is started, the management device is configured to cause the display device to display an operation to be performed by a user in the teaching.

Effects of the Invention

According to the vial supply system of the present invention, the teaching mode starts when a start instruction of the teaching is input via the display device. In the teaching mode, the operations to be performed by a user in the teaching mode are displayed on the display device. Therefore, it is not necessary to perform teaching operations while referring to the instruction manual, and therefore, the teaching can be easily performed.

EMBODIMENTS FOR CARRYING OUT THE INVENTION

Hereinafter, an embodiment of a vial supply system according to the present invention will be described with reference to the accompanying drawings.

Figure 1:
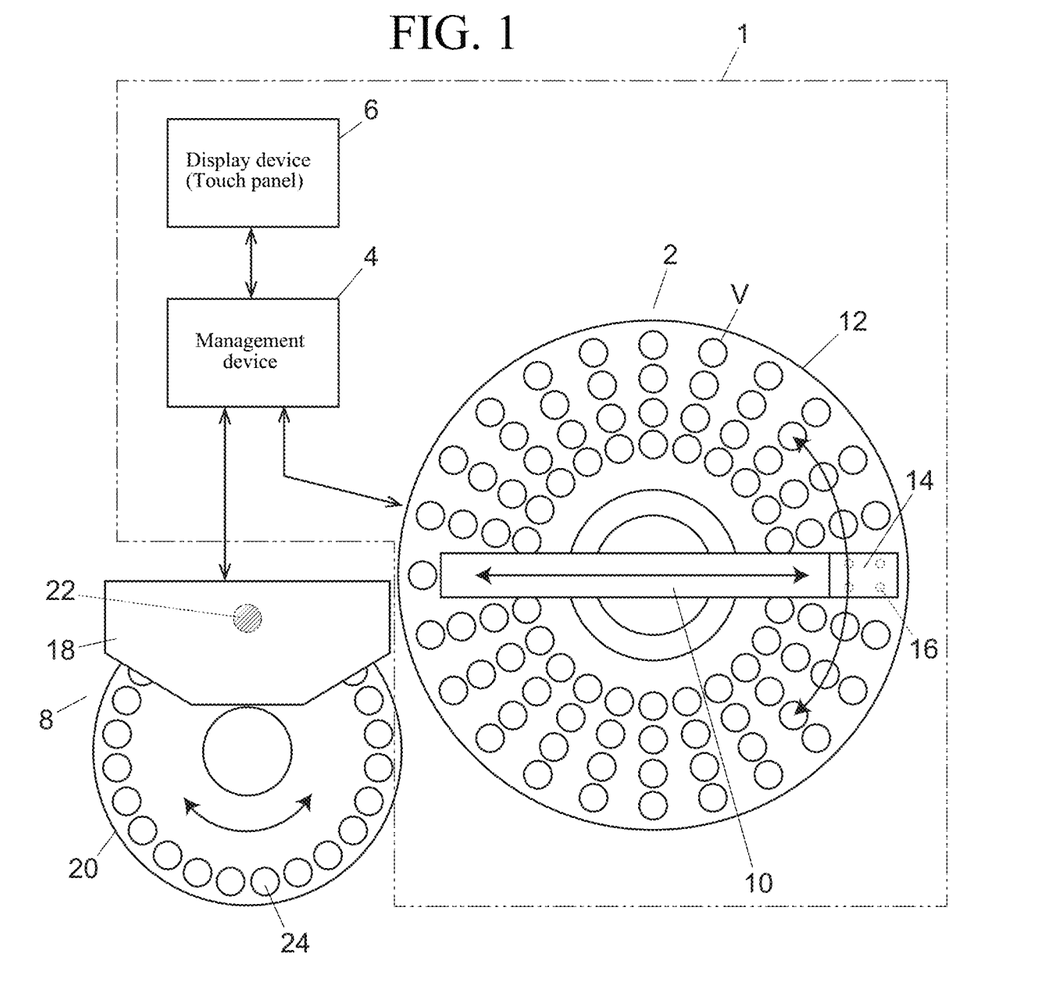
FIG. 1 is a schematic configuration diagram showing one embodiment of a vial supply system together with an injector.

As shown in FIG. 1, the vial supply system 1 is provided with a sampler 2, a management device 4, and a display device 6. The sampler 2 is a device for supplying a vial V containing a sample or the like to an injector 8 which is a supply destination. The management device 4 performs an operation management of the sampler 2 and the injector 8 and can be realized by an electronic circuit including a CPU (Central Processing Unit) and the like. The display device 6 is a touch panel provided so as to be able to communicate with the management device 4 and has both an information display function and an information input function. In this example, the management device 4 is an electronic circuit mounted in the gas chromatograph 100. The display device 6 is a display panel provided to the gas chromatograph 100 (see FIG. 2).

Note that the present invention is not limited thereto. The management device 4 can be realized by an electronic circuit provided outside the gas chromatograph 100. Further, the display device 6 can be realized by a display panel provided to a terminal external of the gas chromatograph 100.

The sampler 2 is provided with a transport arm 10 and a vial holder 12 and is arranged on the side of the injector 8. The vial holder 12 is a circular table capable of setting a plurality of vials V to be supplied to the injector 8. The transport arm 10 is provided so as to extend horizontally above the vial holder 12. A gripper 14 having a plurality of claws 16 for holding the vial V is provided at the distal end portion of the transport arm 10. The transport arm 10 can transport any vial V set in the vial holder 12 with the vial V held by the gripper 14 and supply the vial V to the turret 20 of the injector 8 by a rotational operation within a horizontal plane centering the center of the vial holder 12 and a sliding operation in the axial direction.

The injector 8 is a device disposed above a gas chromatograph 100 (see FIG. 2) and configured to inject a sample into an injection port provided on the upper surface of the gas chromatograph 100. The injector 8 is provided with an injector body 18 and a turret 20. The turret 20 is a circular rotary table. On the upper surface of the turret 20, a plurality of vial receiving holes 24 each for holding a vial is provided on the same circumference. Each vial receiving hole 24 moves in a circular orbit in accordance with the rotation of the turret 20. The injector body 18 is provided with a syringe 22. The syringe 22 is provided so as to be movable vertically with the leading end for sucking and discharging a liquid facing vertically downward. The turret 20 can arrange any vial receiving hole 24 directly below the syringe 22.

Figure 2:
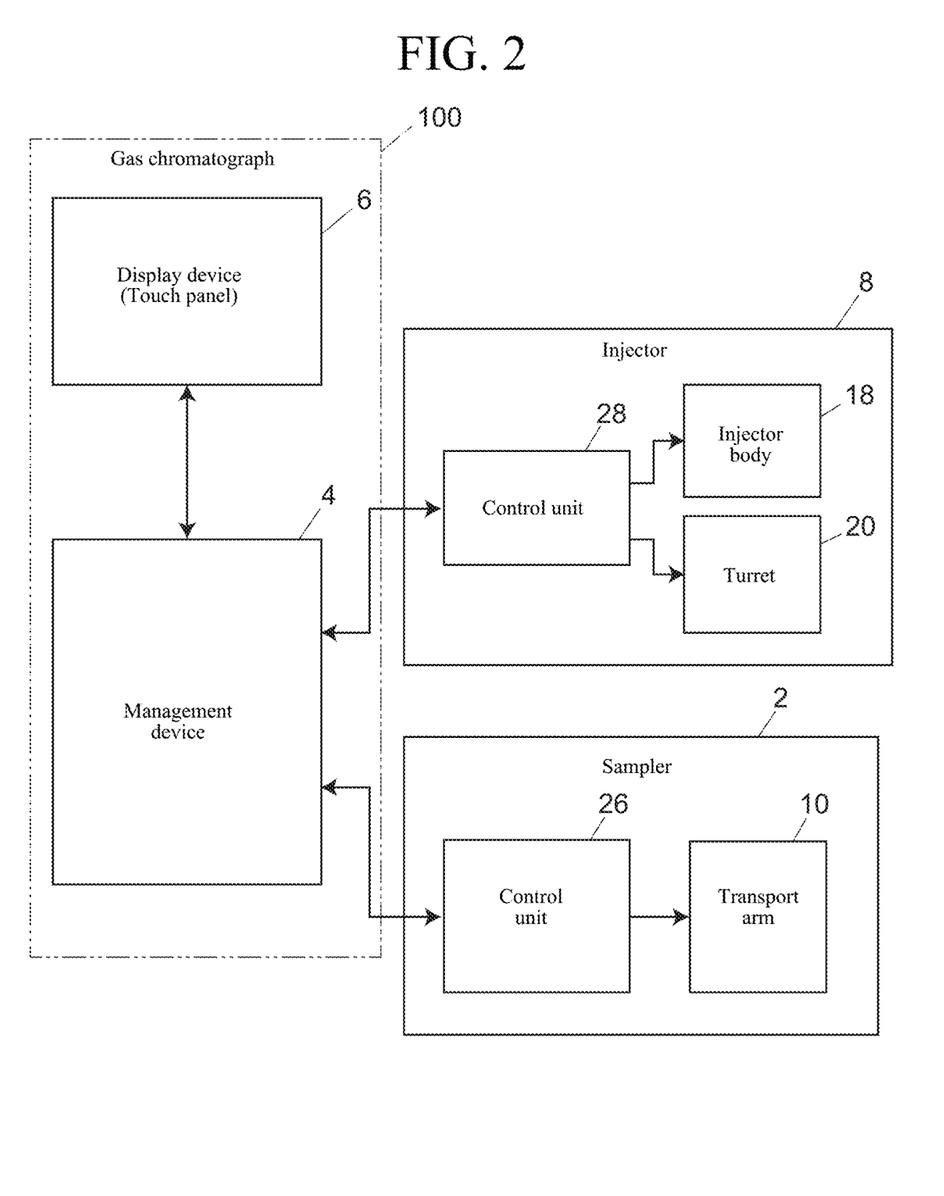
FIG. 2 is a block diagram showing an example of a control system of the embodiment.

As shown in FIG. 2, the sampler 2 and the injector 8 are provided with a control unit 26 and a control unit 28, respectively. The control unit 26 of the sampler 2 controls the operation of the transport arm 10. The control unit 28 of the injector 8 controls the operation of the injector body 18 and the turret 20. The control units 26 and 28 are each realized by an electronic circuit including a CPU and the like and can communicate with the management device 4. The management device 4 outputs control information based on the operation condition set by a user to the control units 26 and 28, and the control units 26 and 28 perform an operation control based on the control information provided from the management device 4. Further, the management device 4 is configured to assist the teaching by a user for setting the position of the transport arm 10 via the display device 6 when a vial is transported between the sampler 2 and the turret 20 of the injector 8.

Figure 3:
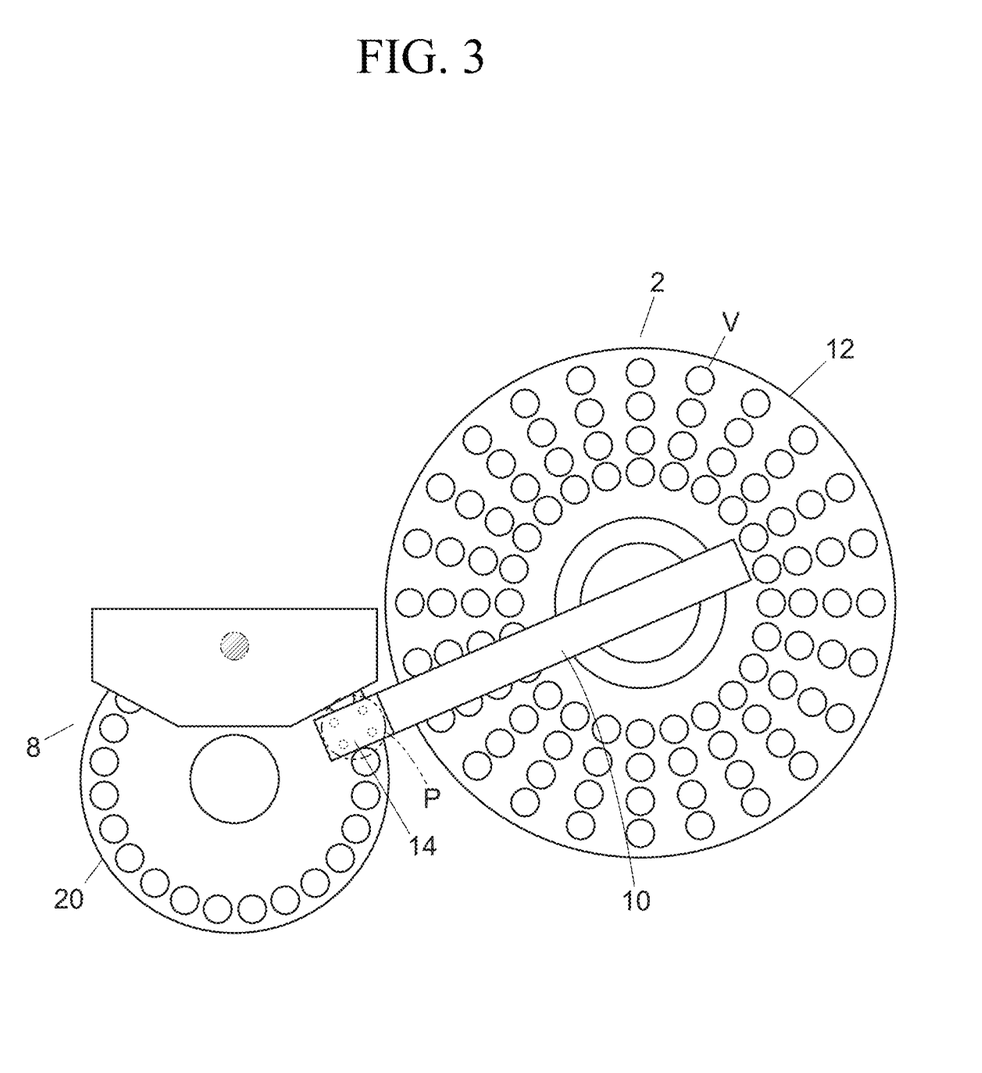
FIG. 3 is a diagram showing a state in which a transport arm of the sampler transports a vial to and from an injector in the embodiment.

As shown in FIG. 3, when a vial is transported between the transport arm 10 of the sampler 2 and the turret 20 of the injector 8, the sampler 2 needs to accurately position the gripper 14 of the transport arm 10 at a predetermined delivery position P above the turret 20. The teaching of the sampler 2 is an operation of adjusting the position of the transport arm 10 while being visually confirmed by a user so that the gripper 14 is positioned at a position where the vial V in the vial receiving hole 24 arranged at the delivery position P can be held and storing the position of the transport arm 10 at that time in the sampler 2 and/or the management device 4. The management device 4 assists the teaching operation by a user by displaying the operations to be performed by the user in the teaching on the display device 6.

The operation when performing the teaching of the sampler 2 will be described with reference to the flowchart in FIG. 4 together with FIG. 1.

Figure 5:
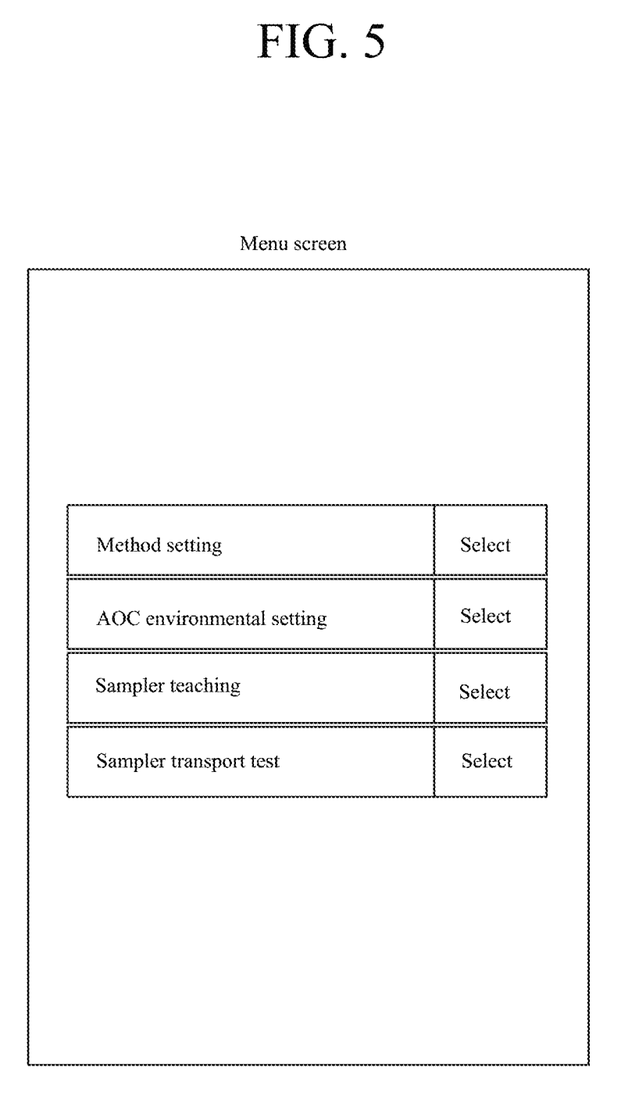
FIG. 5 shows an example of a menu screen displayed on a display device in the embodiment.

When the system is started, the management device 4 displays a menu screen as shown in FIG. 5 on the display device 6. In the menu screen exemplified in FIG. 5, menus, such as, e.g., "Method setting", "AOC (automatic sample injection device) environmental setting", "Sampler teaching", and "Sampler transport test" are displayed, and a user can select a desired menu. When the "Sampler teaching" of the menu screen is selected, it shifts to a teaching mode for performing the teaching of the sampler 2.

Figure 4:
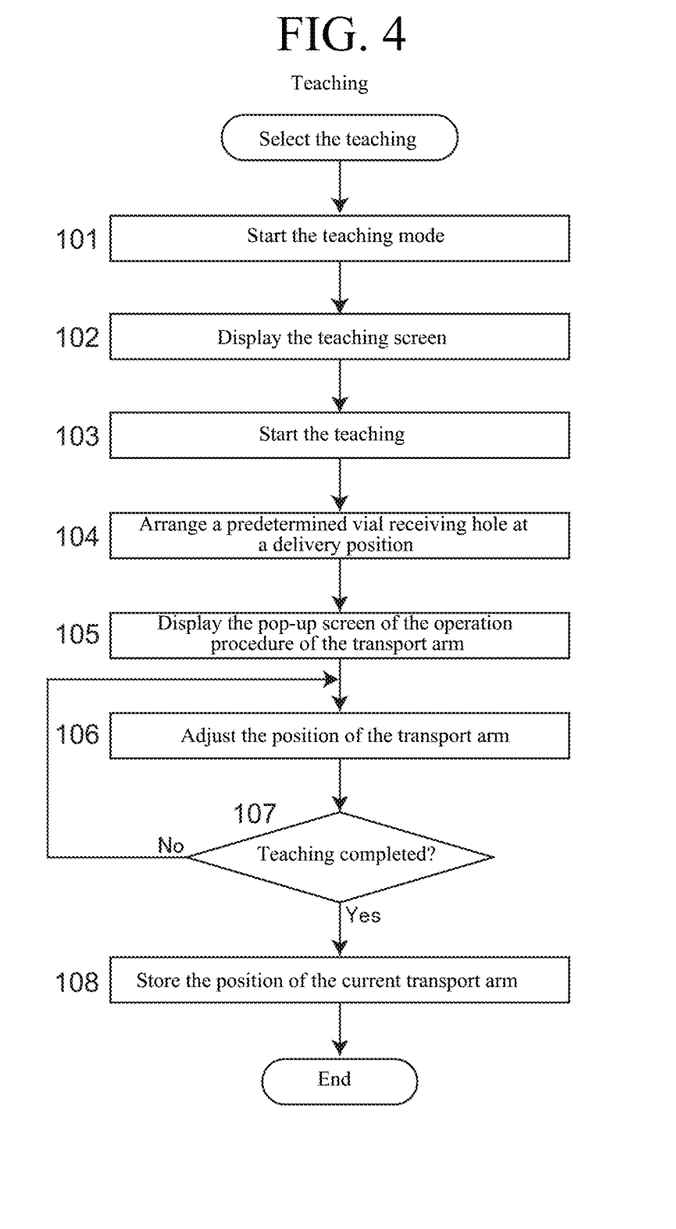
FIG. 4 is a flowchart showing an example of an operation at the time of the teaching in the embodiment.
Figure 6:
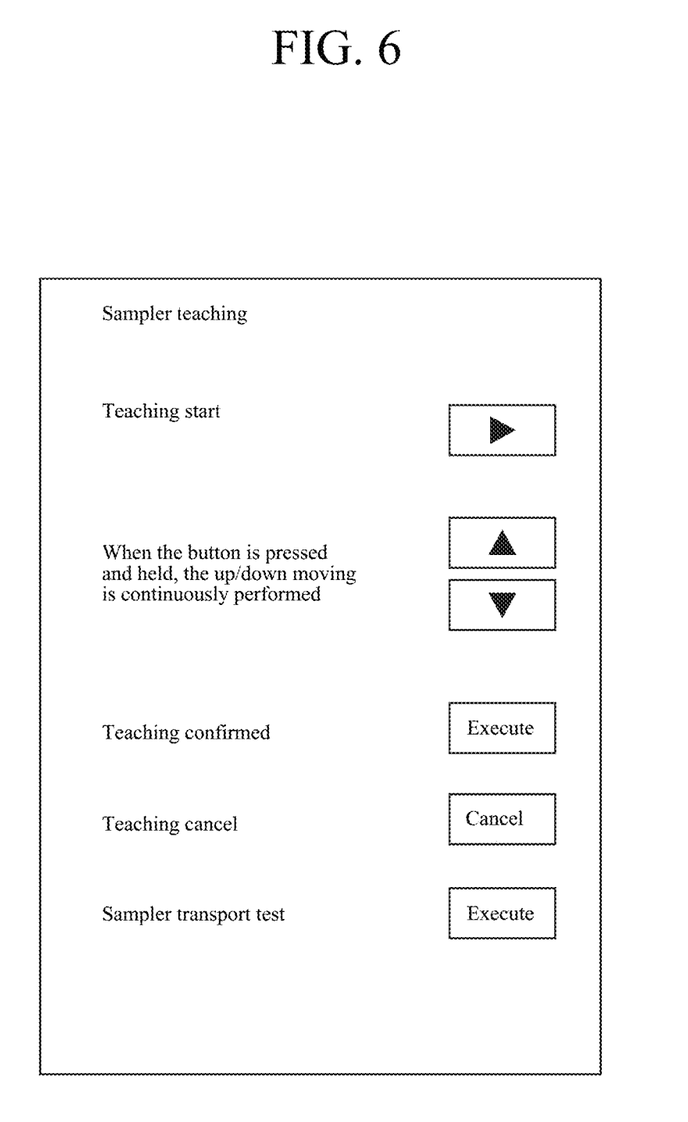
FIG. 6 shows an example of a screen displayed on the display device when sampler teaching is selected.

When a user selects the "Sampler teaching" in the menu screen, the management device 4 starts the teaching mode (FIG. 4: Step 101) and displays the sampler teaching screen as shown in FIG. 6 on the display device 6 (FIG. 4: Step 102). When the user selects the "Teaching start" in the sampler teaching screen (FIG. 4: Step 103), the management device 4 transmits a signal of the teaching start to the injector 8 and arranges the predetermined vial receiving hole 24 used for the teaching at the delivery position P (FIG. 4: Step 104). Note that, as a premise of the teaching start, it is required that the vial V to be used for the teaching is set (loaded) to the vial receiving hole 24 to be used for the teaching. For this reason, it may be configured such that the management device 4 causes the display device 6 to display a screen for prompting the setting (loading) of the vial V to a predetermined vial receiving hole 24 when, for example, the user selects the "Teaching start".

The transport arm 10 is configured to move in the horizontal plane direction (longitudinal and rotational directions of the transport arm 10) and in the vertical direction. The teaching includes a manual operation process by which a user manually moves the transport arm 10 in a horizontal plane direction and a panel operation process by which the transport arm 10 is moved in the vertical direction by an operation via the display device 6.

Figure 7:
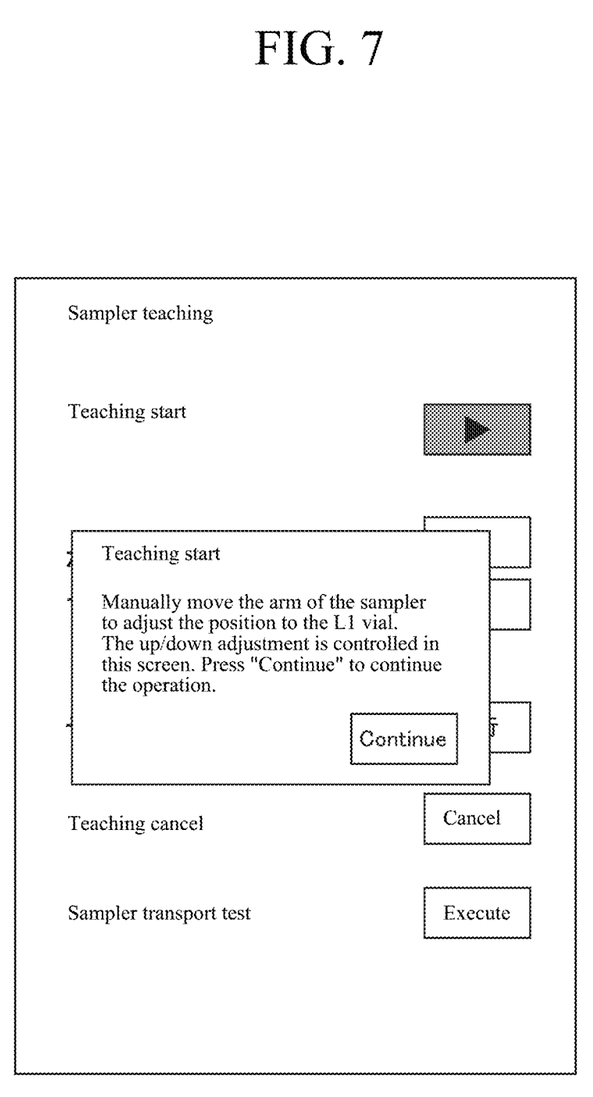
FIG. 7 shows an example of a screen displayed on the display device when the teaching start is selected on the screen of FIG. 6.

As shown in FIG. 7, the management device 4 causes the teaching screen to display the operating procedures to be performed by a user in the teaching mode, i.e., the operating procedures of the transport arm 10. That is, the management device 4 causes the teaching screen to display a pop-up screen in the sampler teaching screen (FIG. 4: Step 105) and display up/down direction instruction buttons (▲ button and ▼ button in FIG. 6) for moving the transport arm 10 in the vertical direction in the sampler teaching screen. According to the operation procedure displayed in the pop-up screen, the user manually moves the transport arm 10 to adjust the gripper 14 to the position above the vial V arranged at the delivery position P. Then, the user moves the transport arm 10 in the vertical direction by the up/down direction instruction buttons displayed on the display device 6 such that the gripper 14 can hold the vial V (FIG. 4: Step 106).

When the user touches any one of the up/down direction instruction buttons display on the display device 6, the management device 4 is configured to detect the up/down direction instruction button which is being touched by the user and transmit a control signal for moving the transport arm 10 in the direction of the up/down direction instruction button which is being touched by the user to the sampler 2. That is, in the teaching mode, when a user is pressed and held any one of the up/down direction instruction buttons displayed on the display device 6, the transport arm 10 moves by a distance corresponding to the time touched by the user in the direction of the up/down direction instruction button touched by the user.

After the position of the transport arm 10 has been adjusted to the position at which the vial V arranged at the delivery position P can be held by the gripper 14 by the above-described manual operation process and panel operation process, when the user selects the "Teaching confirmed" in the sampler teaching screen, the teaching is completed (Step 107 in FIG. 4), and the current (adjusted) position of the transport arm 10 is stored as the "teaching position" by the sampler 2 and/or the management device 4.

Further, as shown in FIGS. 5 and 6, in the menu screen and the sampler teaching screen, it is possible to select a transport test of the sampler 2. By selecting the "Sampler transport test" in the menu screen or the sampler teaching screen, the user can perform a transport test to confirm whether or not the vial can be correctly transported using the currently stored teaching position.

The transport test may be executed to confirm whether or not the teaching has been successfully completed after the completion of the teaching. Further, in a case where both the sampler 2 and the injector 8 are moved without changing their positional relation, or in a case where the type of the vial has been changed, a transport test can be performed to determine whether or not new teaching should be performed.

Figure 8:
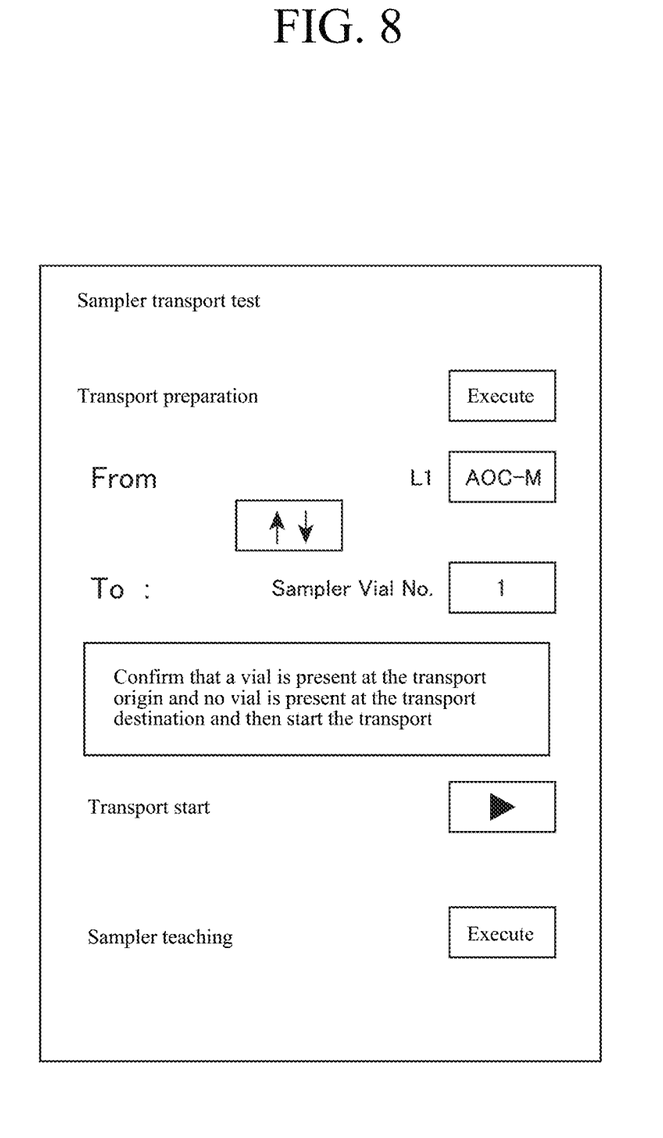
FIG. 8 shows an example of a screen displayed on the display device when the sampler transport test is selected.

FIG. 8 shows an example of a screen displayed on the display device 6 when the "Sampler transport test" is selected. In this sampler transport test screen, it is possible to set a transport condition, such as, e.g., the transport origin of the vial and the transport destination of the vial. In the sampler transport test screen, a button for replacing the transport origin and the transport destination is provided, and therefore, the setting of the transport direction of the vial can be easily replaced. In addition, as shown in FIG. 8, in the sampler transport test screen, the user can be prompted to confirm whether or not the vial has been correctly loaded at the transport origin.

When a user loads the vial at a location set as the transport origin (e.g., a particular vial receiving hole 24 of the injector 8) and touches the transport start button, the management device 4 performs the vial transport between the vial holder 12 of the sampler 2 and the turret 20 of the injector 8. The user visually confirms whether or not the transport has been normally performed, and when the transport has not been normally performed, the user can transfer the procedure to the teaching. In the sampler transport test screen shown in FIG. 8, a button for selecting the sampler teaching is displayed so that the teaching can be performed immediately after the transport test.

The vial supply system 1 described above constitutes a gas chromatography analysis system together with the gas chromatograph 100 and the injector 8.

It should be noted that the embodiment described above is merely one example of an embodiment of the vial supply system according to the present invention. The embodiment of the vial supply system according to the present invention is as follows.

In one embodiment of the vial supply system according to the present invention, a vial supply system includes: a sampler configured to supply a vial to a predetermined supply destination by a transport arm; a management device communicatively connected to the sampler, the management device being configured to manage a supply operation of the vial by the sampler; and a display device provided so as to be able to communicate with the management device. When a teaching mode for performing teaching for setting a position of the transport arm at the time when the transport arm of the sampler transports the vial to and from the supply destination is started, the management device is configured to cause the display device to display an operation to be performed by a user in the teaching.

In the first aspect of the above-described embodiment, the display device is a touch panel. The teaching includes a panel operation process for moving the transport arm in a vertical direction by an operation of the user via the touch panel. The management device is configured to cause the touch panel to display an up/down direction instruction button for instructing a direction of moving the transport arm in the panel operation process and cause the sample to move the transport arm in a vertical direction by a distance corresponding to a time during which the up/down direction instruction buttons are being touched in a direction of the touched up/down direction instruction button when the user touches the up/down direction instruction button. With this configuration, a user can easily perform the height adjustment of the transport arm via the touch panel.

In the above-mentioned first aspect, the teaching includes a manual operation process for causing the user to manually move the transport arm in a horizontal plane direction. The management device is configured to cause the touch panel to display an instruction to manually move the transport arm in the horizontal plane direction in the manual operation process. With this, the user can easily recognize that the planar positioning of the transport arm should be performed manually.

In the second aspect of the above-described embodiment, the management device is configured to cause the sampler to perform a transport test when an instruction to perform a transport test for confirming whether or not the transport arm is able to transport the vial to and from the supply destination is input via the display device. With this configuration, it is possible to easily confirm whether or not the teaching has been successfully performed. For example, in a case where the sampler has been moved, or in a case where the type of the vial has been changed, it is possible to confirm whether or not teaching should be performed by performing the transport test first, which can avoid unnecessary teaching from being performed.

In the above-described second aspect of the present invention, the management device is configured to cause the user to set a transport condition of the transport test via the display device and cause the sampler to perform the transport test based on the transport condition set via the display device.

In a third aspect of the above embodiment, the management device is an electronic circuit provided in a gas chromatograph, and the display device is a display panel provided on the gas chromatograph or a display panel provided on an external terminal.

In one embodiment of the gas chromatography analysis system according to the present invention, a gas chromatography analysis system includes: a gas chromatograph; an injector configured to inject a sample into the gas chromatograph; and the above-described vial supply system for supplying a vial containing a sample to the injector.

DESCRIPTION OF THE SYMBOLS

1: Vial supply system
2: Sampler
4: Management device
6: Display device
8: Injector
10: Transport arm
12: Vial holder
14: Gripper
16: Craw
18: Injector body
20: Turret
22: Syringe
24: Vial receiving hole
26: Control unit of a sampler
28: Control unit of an injector
100: Gas chromatograph

The invention claimed is:

1. A vial supply system comprising:
a sampler configured to supply a vial to a predetermined supply destination by a transport arm;
a management device communicatively connected to the sampler, the management device being configured to manage a supply operation of the vial by the sampler; and
a display device provided so as to be able to communicate with the management device,
wherein when a teaching mode for performing teaching for setting a position of the transport arm at the time when the transport arm of the sampler transports the vial to and from the supply destination is started, the management device is configured to cause the display device to display an operation to be performed by a user in the teaching,
wherein the display device is a touch panel,
wherein the teaching includes a panel operation process for moving the transport arm in a vertical direction by an operation of the user via the touch panel, and
wherein the management device is configured to cause the touch panel to display an up/down direction instruction button for instructing a direction of moving the transport arm in the panel operation process and cause the sampler to move the transport arm in a vertical direction by a distance corresponding to a time during which the up/down direction instruction button is being touched in a direction of the touched up/down direction instruction button when the user touches the up/down direction instruction button.

2. The vial supply system as recited in claim 1,
wherein the teaching includes a manual operation process for causing the user to manually move the transport arm in a horizontal plane direction, and
wherein the management device is configured to cause the touch panel to display an instruction to manually move the transport arm in the horizontal plane direction in the manual operation process.

3. The vial supply system as recited in claim 1,
wherein the management device is configured to cause the sampler to perform a transport test when an instruction to perform the transport test for confirming whether or not the transport arm is able to transport the vial to and from the supply destination is input via the display device.

4. The vial supply system as recited in claim 3,
wherein the management device is configured to cause the user to set a transport condition of the transport test via the display device and cause the sampler to perform the transport test based on the transport condition set via the display device.

5. The vial supply system as recited in claim 1,
wherein the management device is an electronic circuit provided in a gas chromatograph, and
wherein the display device is a display panel provided on the gas chromatograph or a display panel provided on an external terminal.

6. A gas chromatography analysis system comprising:
a gas chromatograph;
an injector configured to inject a sample into the gas chromatograph; and
the vial supply system recited in claim 1 for supplying a vial containing a sample to the injector.

* * * * *